(12) United States Patent
Owaki et al.

(10) Patent No.: US 8,181,064 B2
(45) Date of Patent: May 15, 2012

(54) INFORMATION PROCESSING APPARATUS FOR INHIBITING INSTRUCTIONS, SAVING AND RESTORING INTERNAL INFORMATION IN RESPONSE TO ABNORMALITY IN REDUNDANT PROCESSOR SYSTEM

(75) Inventors: Takeshi Owaki, Kawasaki (JP); Takaharu Ishizuka, Kawasaki (JP); Toshikazu Ueki, Kawasaki (JP); Makoto Hataida, Kawasaki (JP); Yuka Hosokawa, Kawasaki (JP); Atsushi Morosawa, Kawasaki (JP); Takashi Yamamoto, Kawasaki (JP); Daisuke Itou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/659,896

(22) Filed: Mar. 24, 2010

(65) Prior Publication Data

US 2010/0191942 A1 Jul. 29, 2010

(51) Int. Cl.
*G06F 11/00* (2006.01)
(52) U.S. Cl. .......................................... 714/11
(58) Field of Classification Search .................. None
See application file for complete search history.

(56) References Cited

U.S. PATENT DOCUMENTS

| | | | | |
|---|---|---|---|---|
| 4,589,090 | A | * | 5/1986 | Downing et al. ............... 714/10 |
| 5,153,881 | A | * | 10/1992 | Bruckert et al. ............... 714/10 |
| 5,214,652 | A | * | 5/1993 | Sutton .............................. 714/10 |
| 5,737,509 | A | | 4/1998 | Fushimi et al. |
| 5,748,873 | A | * | 5/1998 | Ohguro et al. .................. 714/11 |
| 5,915,082 | A | * | 6/1999 | Marshall et al. ................. 714/11 |
| 6,393,582 | B1 | * | 5/2002 | Klecka et al. .................... 714/11 |
| 6,654,648 | B2 | * | 11/2003 | Nada et al. ....................... 700/19 |
| 6,948,092 | B2 | * | 9/2005 | Kondo et al. .................... 714/12 |
| 7,055,060 | B2 | * | 5/2006 | Nguyen et al. .................. 714/11 |
| 7,085,959 | B2 | * | 8/2006 | Safford .......................... 714/11 |
| 7,200,772 | B2 | * | 4/2007 | Datta et al. ...................... 714/13 |
| 7,496,786 | B2 | * | 2/2009 | Graham et al. ................. 714/12 |
| 2004/0019771 | A1 | * | 1/2004 | Quach ............................ 712/229 |
| 2004/0221193 | A1 | * | 11/2004 | Armstrong et al. ............. 714/10 |
| 2006/0107107 | A1 | * | 5/2006 | Michaelis et al. .............. 714/11 |
| 2006/0133410 | A1 | | 6/2006 | Yoshida |
| 2008/0046694 | A1 | * | 2/2008 | Ueki et al. ...................... 712/214 |
| 2008/0168305 | A1 | * | 7/2008 | Gschwind et al. ............... 714/10 |

FOREIGN PATENT DOCUMENTS

JP 6-35736 2/1994

(Continued)

OTHER PUBLICATIONS

Baleani et al. (Fault-Tolerant Platforms for Automotive Safety-Critical Applications); CASES '03 Proceedings of the 2003 international conference on Compilers, architecture and synthesis for embedded systems; 8 pages.*

(Continued)

*Primary Examiner* — Keith Vicary
(74) *Attorney, Agent, or Firm* — Staas & Halsey LLP

(57) ABSTRACT

A northbridge, when detecting a synchronization break of a redundant CPU, stops the operation of an abnormal CPU bus where an error has occurred and the firmware in a firmware hub instructs the northbridge to inhibit an external instruction. In addition, the firmware saves the inside information of a normal CPU connected to a normal CPU bus and cache data on a memory and the northbridge issues reset to all CPUs in the home system board. The firmware then restores the inside information of the CPU saved on the memory to all CPUs and instructs the northbridge to cancel the inhibition of the external instruction.

3 Claims, 11 Drawing Sheets

FOREIGN PATENT DOCUMENTS

| | | |
|---|---|---|
| JP | 6-30069 | 4/1994 |
| JP | 7-6049 | 1/1995 |
| JP | 2561181 | 12/1996 |
| JP | 2536789 Y2 | 5/1997 |
| JP | 3253473 | 2/2002 |
| JP | 2002-538521 | 11/2002 |
| JP | 2006-172390 | 6/2006 |
| JP | 2006-178614 | 7/2006 |

OTHER PUBLICATIONS

International Search Report for PCT/JP2007/068503, mailed on Jan. 8, 2008.

English Translation of the International Preliminary Report mailed Apr. 15, 2010 in corresponding International Preliminary Report on Patentability PCT/JP2007/068503.

* cited by examiner

INFORMATION PROCESSING APPARATUS FOR INHIBITING INSTRUCTIONS, SAVING AND RESTORING INTERNAL INFORMATION IN RESPONSE TO ABNORMALITY IN REDUNDANT PROCESSOR SYSTEM

CROSS-REFERENCE TO RELATED APPLICATION

This application is based upon and claims the benefit of priority of the prior PCT International Application PCT/JP2007/068503 filed on Sep. 25, 2007, the entire contents of which are incorporated herein by reference.

FIELD

An embodiment discussed herein relates to an information processing apparatus in which a plurality of arithmetic processors (e.g., CPUs) are configured in redundant and, for example, as redundant CPUs, perform synchronous operation and a control method for the information processor. More particularly, the invention relates to an information processing apparatus that performs resynchronization of the redundant arithmetic processors when a synchronization break occurs among the arithmetic processors and a control method for the information processing apparatus.

BACKGROUND

In a system, such as a multiprocessor system in which an open source OS like a UNIX (registered trademark), Linux or the like is operated and a plurality of CPUs, after one CPU in a pair of CPUs as a operative one and a redundant one temporarily fails and is degenerated and switched to the other CPU by performing redundancy operation (synchronous operation), in order to reset the CPUs to a redundant configuration, it is necessary to stop the system once, then perform resynchronization of the redundant CPUs and restart of the OS. The CPUs performing the synchronous operation mean CPUs that execute the same processing simultaneously.

As a specific technique concerning a multiprocessor system including plural processors, Patent Document 1 described below describes a multiplex system that sets one of three or more processors in a normal mode and the remaining processors in a monitor mode to monitor an execution state of the processors in the normal mode, judges the processors in the normal mode as being abnormal when every processors in the monitor mode generates abnormal signals and judges the processors in the monitor mode as being abnormal when one of the processors in the monitor mode generates an abnormal signal.

Patent Document 2 described below describes a redundant system realizes resynchronization of state devices respectively provided in redundant first CPU and second CPU, and when any abnormality occurs in one specific state device among the state devices in the second CPU, for example, and synchronization is necessary, a resynchronization server issues a resynchronization command to the specific state device and a state device corresponding to the specific state device in the first CPU to restart both the state devices.

Patent Document 1: Japanese Laid-open Patent Publication No. 6-30069

Patent Document 2: National Publication of International Patent Application No. 2002-538521

As explained above, conventionally, after performing degeneration of any one of the redundant CPUs that perform synchronous operation, in order to set the CPUs into the redundant configuration again, it is necessary to stop the system once, perform resynchronization of the redundant CPUs and restart of the OS. However, in a backbone system required to perform continuous operation, such a temporary stop of the system causes a problem that the continuous operation cannot be performed.

In the conventional technique described in Patent Document 1, it is necessary to use a dedicated processor having an interface for receiving a control signal from a control unit that detect abnormality of the processor to stop an operation of a processor. In the conventional technique, even when a temporary failure in the processor due to a software error or the like occurs, the processor is disconnected from the system. Since the conventional technique is for determining an abnormal processor on the basis of decision by majority, when abnormality is detected in two processors remaining after detecting, both the processors are stopped.

The conventional technique described in Patent Document 2 is a resynchronization technique for state devices in a particular system; in which restarting all the state devices relating to a state device being abnormal does not affect the states of the other state devices. Consequently, the resynchronization processing for such state devices in the conventional technique depends on functions of an OS that runs on the system and does not apply for a device that run a general-purpose OS without such functions.

SUMMARY

An information processing apparatus according to the present invention is an information processing apparatus having first and second arithmetic processors configured in redundancy with each other that simultaneously execute the same processing, a first control device connected to the first and second arithmetic processors, and a storing device and a second control device connected via the first control device, wherein the first control device includes: a synchronization break detecting unit for detecting a synchronization break by detecting abnormality that occurs in any one of the first and second arithmetic processors; an instruction issue stopping unit for stopping issuance of an instruction of the arithmetic processor in which the abnormality is detected; an instruction inhibiting unit for inhibiting an instruction issued from the second control device to the first control device; a saving unit for saving, on the storing device, inside information held by a normal arithmetic processor of the first and second arithmetic processor; an initializing unit for performing initialization of the first and second arithmetic processors; a restoring unit for restoring the inside information saved on the storing device to the initialized first and second arithmetic processors; and an instruction inhibition canceling unit for canceling, when the inside information is restored to the first and second arithmetic processors, the inhibition of the instruction issued from the second control device to the first control device and resuming synchronous operation of the first and second arithmetic processors.

Preferably, in the information processing apparatus according to the present invention, the first control device further may include a determining unit for determining, when the issuance of the instruction for the arithmetic processor in which the abnormality is detected is stopped, whether the number of times the synchronous operation of the first and second arithmetic processors is resumed is equal to or larger than a predetermined number of times and causing, when the number of times the synchronous operation is resumed is equal to or larger than the predetermined number of times, the restoring means to restore the inside information saved on the storing device to only the normal arithmetic processor of the first and second arithmetic processors.

DESCRIPTION OF EMBODIMENTS

Figure 1:
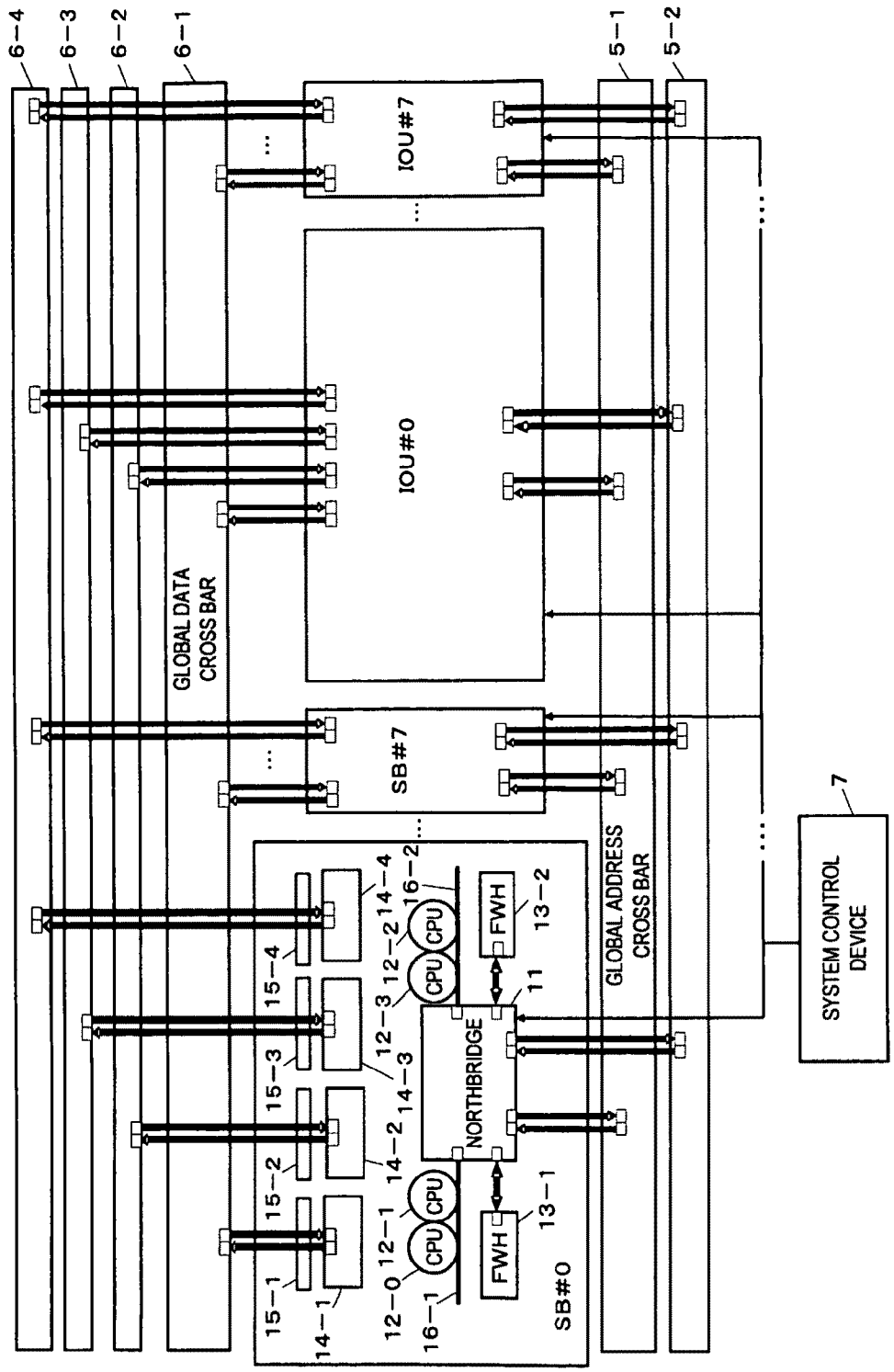
FIG. 1 is a diagram illustrating an example of the overall configuration of an embodiment of the present invention.

FIG. 1 is a diagram illustrating an example of the overall configuration of an embodiment of the present invention. This embodiment is realized as, for example, a multiprocessor system including plural system boards (a SB#0 to a SB#7) illustrated in FIG. 1. An IOU#0, . . . , to an IOU#7 illustrated in FIG. 1 are I/O (input and output interface) units corresponding to the SB#0, . . . , to the SB#7, respectively. The number of system boards and the number of I/O units included in the multiprocessor system are not limited to the number of system boards and the number of I/O units illustrated in FIG. 1.

This embodiment may be realized as, for example, an information processing apparatus including a first system board (e.g., the SB#0) including a first and a second arithmetic processors (e.g., a CPU 12-0 to a CPU 12-2 in FIG. 1) configured in redundancy with each other that simultaneously execute the same processing, a first control device (e.g., a northbridge 11) connected to the first and second arithmetic processors, and storing devices (e.g., memories 15-1 to 15-4) connected to the first control device, a second system board (e.g., the SB#7) including a second control device (a northbridge not illustrated in the figure other than the northbridge 11), and a relay device (e.g., a global address cross bar 5-1) that relays the first and second system boards. The first and second arithmetic processors made redundant with each other are, for example, a pair of CPUs (redundant CPUs) configured in redundancy by synchronous operation.

Further, this embodiment may be realized as, for example, an information processing apparatus including first and second arithmetic processors (e.g., the CPU 12-0 and the CPU 12-2 in FIG. 1) configured in redundant with each other that simultaneously execute the same processing, a first control device (e.g., the northbridge 11) connected to the first and second arithmetic processors, storing devices (e.g., the memories 15-1 to 15-4) connected via the first control device, and a second control device (e.g., a northbridge not illustrated in the figure other than the northbridge 11).

As illustrated in FIG. 1, the SB#0 includes plural CPUs (CPUs 12-0 to 12-3), the northbridge 11, firmware hubs (FWHs) 13-1 and 13-2, memory controllers 14-1 to 14-4, memories 15-1 to 15-4, and CPU buses 16-1 and 16-2. For example, the CPU 12-0 connected to the CPU bus 16-1 and the CPU 12-2 connected to the CPU bus 16-2 are a pair of CPUs configured in redundancy (redundant CPUs). The CPU 12-1 connected to the CPU bus 16-1 and the CPU 12-3 connected to the CPU bus 16-2 are redundant CPUs. The synchronous operation means simultaneous execution of the same processing. The system boards other than the SB#0 have a configuration same as that of the SB#0.

The northbridge 11 detects a redundancy break (synchronization break), where synchronization cannot be taken between the redundant CPUs, based on an error which occurs in one CPU (one system CPU) of the pair of redundant CPUs. The northbridge 11 performs resynchronization processing for the redundant CPUs according to control by firmware stored in the FWH 13-1 or the FWH 13-2. The redundancy break (synchronization break) means that a pair of CPUs configured in redundancy cannot perform operation synchronously. The resynchronization processing for the redundant CPUs is processing for resetting the CPUs to a redundant configuration. The northbridge 11 executes the resynchronization processing for the redundant CPUs without stopping and restarting an OS running on the system.

The FWHs 13-1 and 13-2 are ROMs in which the firmware is stored. The firmware stored in the FWHs 13-1 and 13-2 controls the northbridge 11 to cause the redundant CPUs to perform the resynchronization processing. Various data are stored in the memories 15-1 to 15-4. The memory controllers 14-1, 14-2, 14-3, and 14-4 respectively control write or read processing for data between the memory controllers 14-1, 14-2, 14-3, and 14-4 and the memories 15-1, 15-2, 15-3, and 15-4. The CPU bus 16-1 is a communication interface between the CPUs 12-0 and 12-1 and the northbridge 11. The CPU bus 16-2 is a communication interface between the CPUs 12-2 and 12-3 and the northbridge 11.

5-1 and 5-2 denote global address cross bars as address relaying means for relaying an instruction issued from each of the system boards and an address as a target of the instruction (e.g., a memory address corresponding to a load instruction or a store instruction) to the other system boards and I/O units. 6-1 to 6-4 denote global data cross bars as processing means for relaying data between the system boards, between the I/O units, and between the system boards and the I/O units. 7 denotes a system control device such as a SVP (service processor) that sets various set values in registers (not illustrated in the figure) included in the system boards and the I/O units. For example, the system control device 7 sets an upper limit value of the number of times of execution of resynchronization of the redundant CPUs in a register included in the northbridge 11 in the SB#0.

First, normal operation of the northbridge included in each of the system boards is explained.

During the normal operation, the northbridge (e.g., the northbridge 11) inputs an instruction (an opcode) issued from each of the CPUs included in the northbridge and an address as a target of the instruction (hereinafter referred to as "address/opcode") to the global address cross bars. Addresses/opcodes issued from the CPUs in the other system boards are also input to the global address cross bars. The global address cross bars select, on the basis of predetermined priority order, a specific address/opcode from the input addresses/opcodes and notify the specific address/opcode to each of the system boards. In other words, the northbridge is external instruction inputting means for inputting, as external instructions, instructions issued from the CPUs in the home system board to all the system boards including the home system board through the global address cross bars.

When the notification is received from the global address cross bars, the northbridge (e.g., the northbridge 11) included in each of the system boards inputs, to the global address cross bars, a packet (an LCST packet explained later with respect to FIG. 15) including information indicating whether the system board corresponding to the home northbridge can continue execution of processing concerning the selected address/opcode (processing possibility information) and information indicating where in the system board and in what kind of state the system board corresponding to the home northbridge stores data corresponding to the notified address (data state information). In operation peculiar to this embodiment, the northbridge that detects redundancy break (synchronization break) of the redundant CPUs inputs, for example, Retry to the global address cross bars as the processing possibility information. Retry is a control signal for instructing an issue source of an instruction issued from the outside to the system board to re-input the instruction because the instruction cannot be received.

The global address cross bars to which the processing possibility information and the data state information are input notify the northbridge included in each of the system boards of the processing ability information and the data state information. The northbridge included in the system notified of the processing possibility information and the data state information executes an instruction that the home northbridge should execute. The northbridge receives, when necessary, data necessary for the execution of the instruction from the other system boards different from the system board corresponding to the home northbridge via the data cross bars. For example, when the SB#0 writes data in the memory 15-1, the SB#0 receives, when necessary, data as a write target from the SB#7 via the global data cross bar 6-1. Then, the SB#0 writes the data in the memory 15-1 according to the control by the memory controller 14-1.

Figure 2:
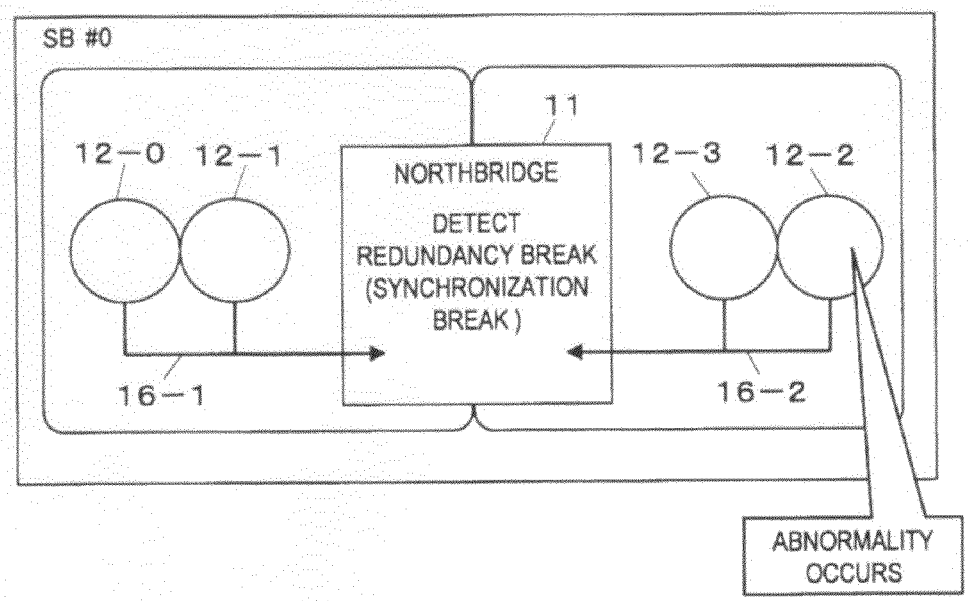
FIG. 2 is an exemplary diagram for explaining an overview of resynchronization processing for redundant CPUs according to the embodiment.

An overview of the resynchronization processing for the redundant CPUs according to this embodiment is explained. First, as illustrated in FIG. 2, the northbridge 11 detects redundancy break (synchronization break) due to an error (abnormality) that occurs in the abnormality occurring CPU (the CPU 12-2) in the redundant CPUs including the CPU 12-0 and the CPU 12-2.

Figure 3:
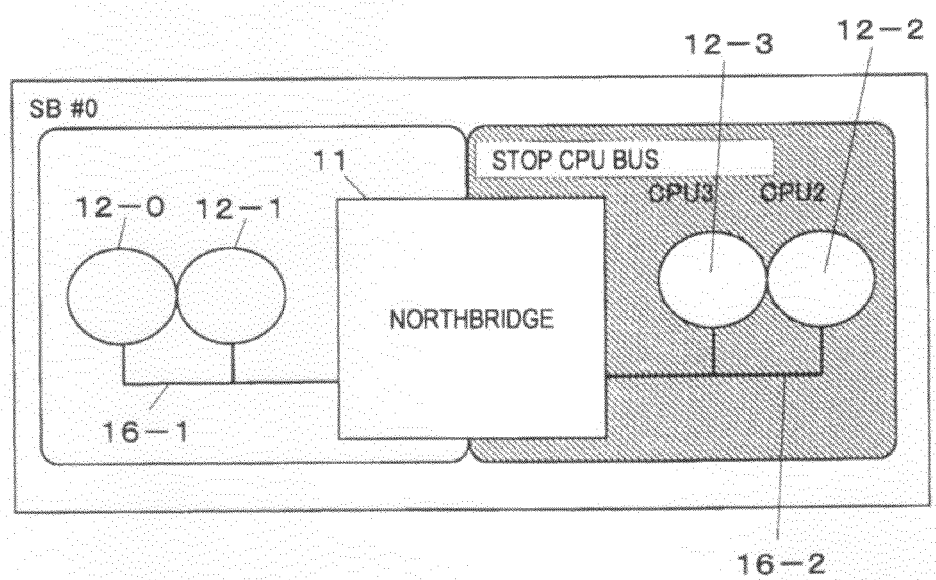
FIG. 3 is an exemplary diagram for explaining the overview of the resynchronization processing for the redundant CPUs according to the embodiment.

Subsequently, as illustrated in FIG. 3, the northbridge 11 stops the operation of the CPU bus 16-2 as a CPU bus (an abnormal CPU bus) to which the abnormality occurring CPU (the CPU 12-2) is connected and stops issuance of an instruction to the device on the outside of the northbridge 11 from the CPU 12-2 and the CPU 12-3 through the CPU bus 16-2 and the northbridge 11. Hatched area in FIG. 3 indicates area in which the operation of the CPU bus 16-2, to which the abnormality issuing CPU is connected, is in a stopped state (the same is illustrated in FIGS. 4 to 8, FIG. 13, and FIG. 14).

Figure 4:
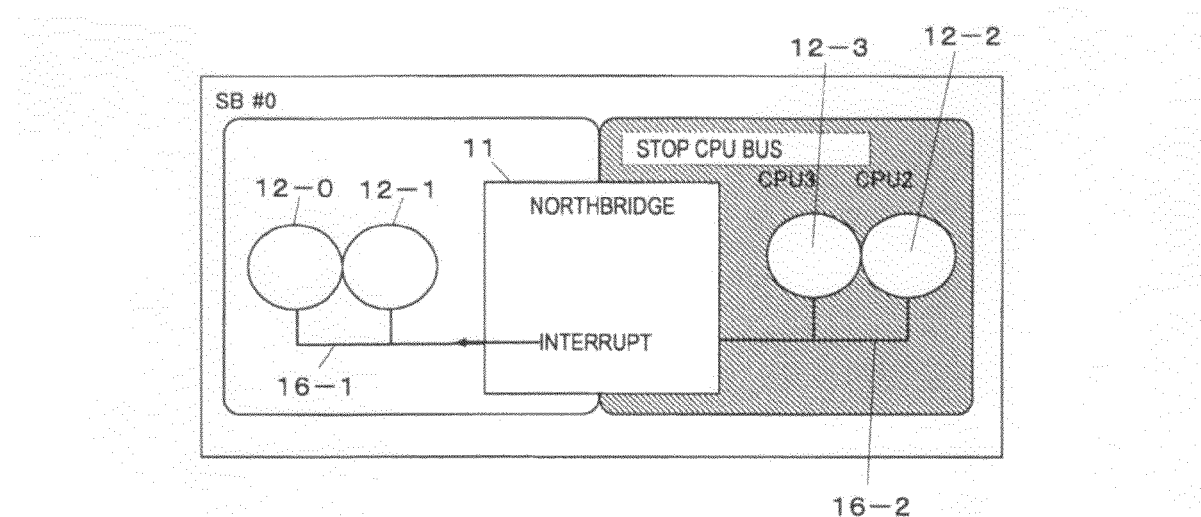
FIG. 4 is an exemplary diagram for explaining the overview of the resynchronization processing for the redundant CPUs according to the embodiment.

As illustrated in FIG. 4, the northbridge 11 notifies the CPU bus 16-1 as a normal CPU bus of an interruption indicating that the operation of the CPU bus 16-2, to which the abnormality occurring CPU is connected, is in the stopped state. The normal CPU bus is a CPU bus to which a normal CPU forming a pair of a redundancy configuration with the abnormality occurring CPU. The interruption notification indicating that the operation of the abnormal CPU bus (the CPU bus 16-2) is stopped is sent to the CPU 12-0 and the CPU 12-1, which are connected to the CPU bus 16-1.

When the interruption notification is sent to the CPUs 12-0 and 12-1, the CPUs 12-0 and 12-1 are allocated to the firmware stored in the FWH 13-1 (or the FWH 13-2) illustrated in FIG. 1 and processing of the running OS is temporarily stopped.

Figure 5:
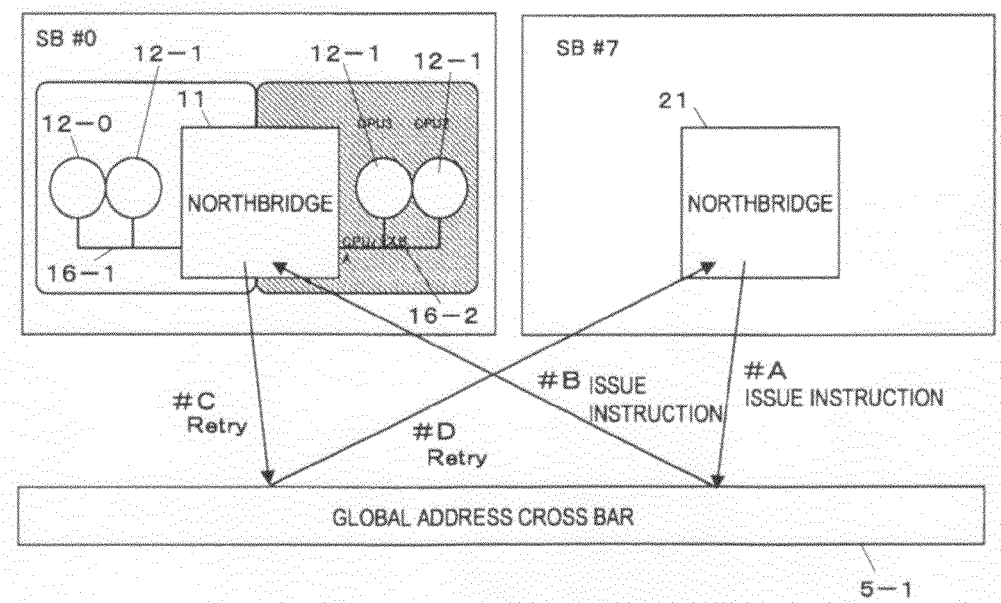
FIG. 5 is an exemplary diagram for explaining the overview of the resynchronization processing for the redundant CPUs according to the embodiment.

The firmware transmits a control signal to the northbridge 11 and, as illustrated in FIG. 5, instructs the northbridge 11 to continue to input Retry to the global address cross bar 5-1. The northbridge 11 continues to input Retry to the global address cross bar 5-1, whereby instructions (external instructions) issued from the system boards other than the SB#0 to the northbridge 11 included in the SB#0 are inhibited.

For example, even if an instruction is issued from the northbridge 21 included in the SB#7 illustrated in FIG. 5 (see #A in FIG. 5) and the instruction is issued from the global address cross bar 5-1 to the northbridge 11 (see #B in FIG. 5), the northbridge 11 inputs Retry to the global address cross bar 5-1 (see #C in FIG. 5) and the Retry is notified to the northbridge 21 through the global address cross bar 5-1 (see #D in FIG. 5). As a result, reception of the instruction issued from the northbridge 21 to the northbridge 11 is inhibited and execution of the instruction by the CPUs 12-0 and 12-1 included in the SB#0 is inhibited.

Figure 6:
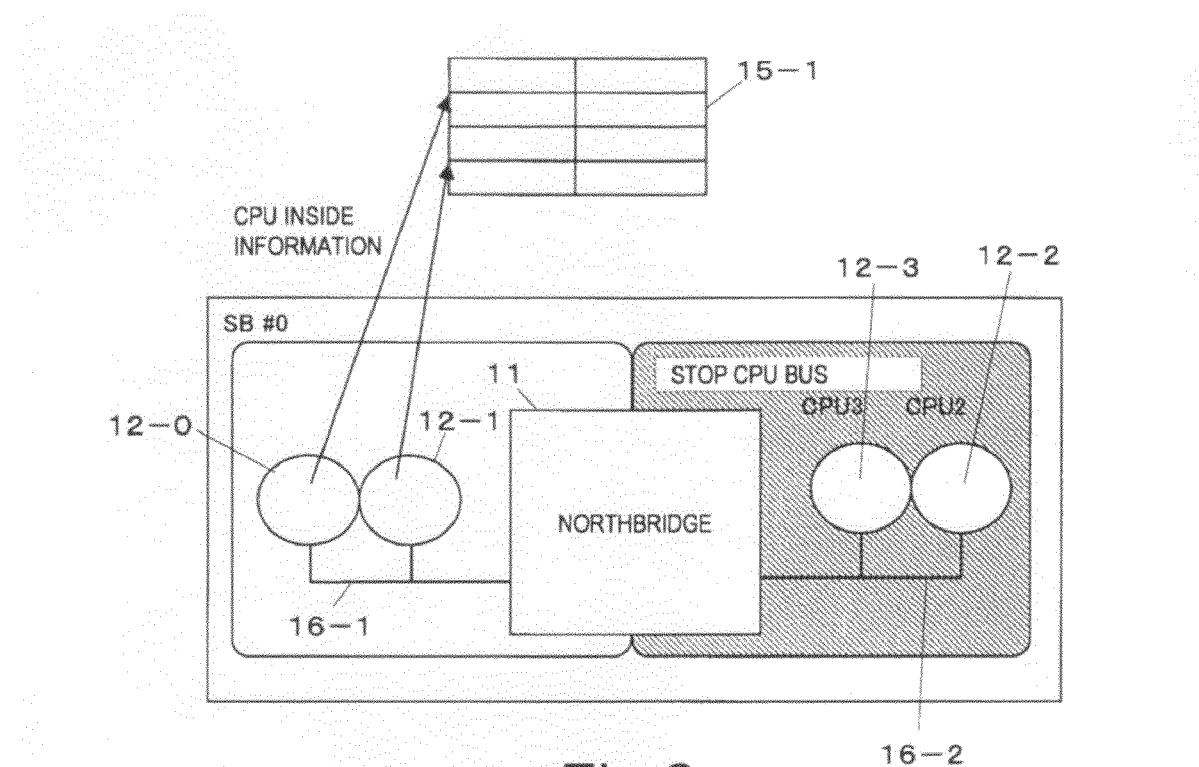
FIG. 6 is an exemplary diagram for explaining the overview of the resynchronization processing for the redundant CPUs according to the embodiment.

As illustrated in FIG. 6, the firmware instructs the CPUs 12-0 and 12-1 as normal CPUs to save, on the memory 15-1, inside information of the CPUs necessary for causing the redundant CPUs to perform resynchronization (e.g., information in the registers included in the CPU 12-0 and the CPU 12-1 at an instance when abnormality occurs in the CPU 12-0). The normal CPUs are CPUs connected to the normal CPU bus. In other words, the firmware is saving means for saving inside information held by the normal CPU of the redundant CPUs on the storing device.

Figure 7:
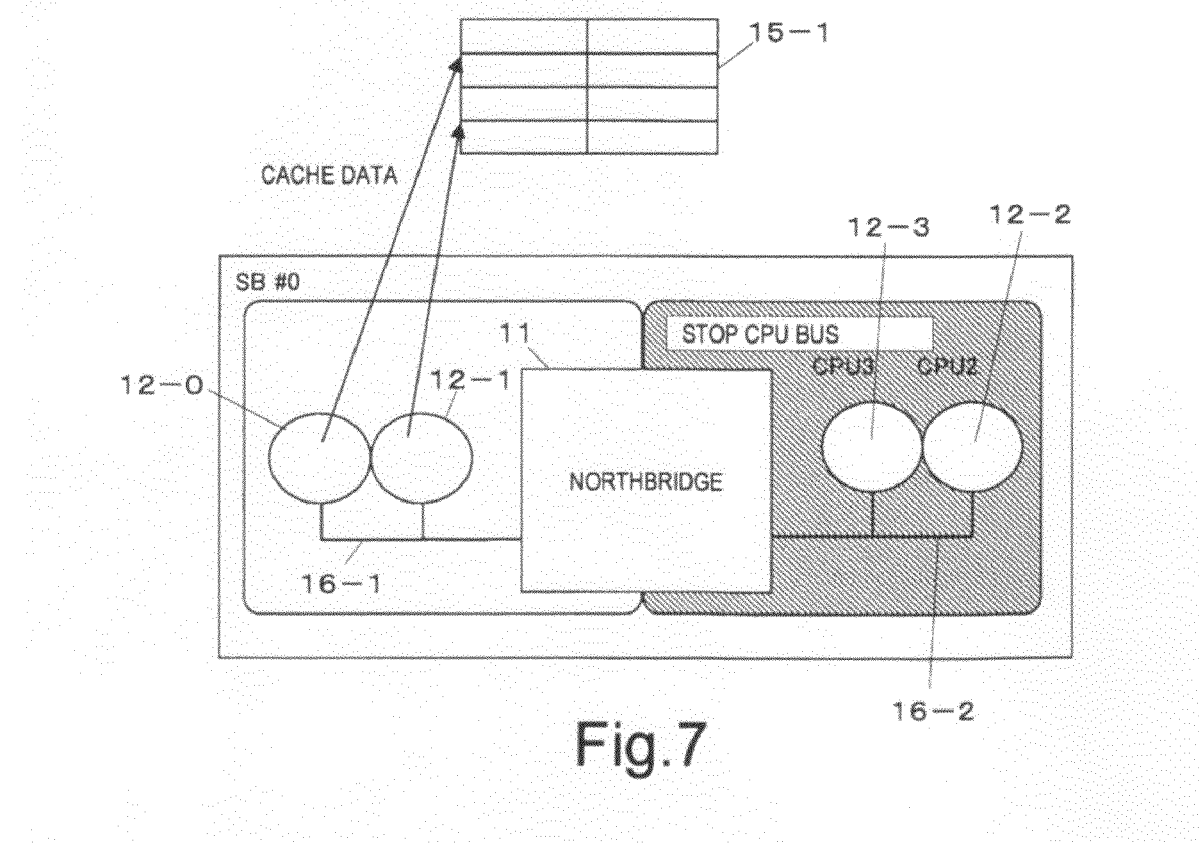
FIG. 7 is an exemplary diagram for explaining the overview of the resynchronization processing for the redundant CPUs according to the embodiment.
Figure 8:
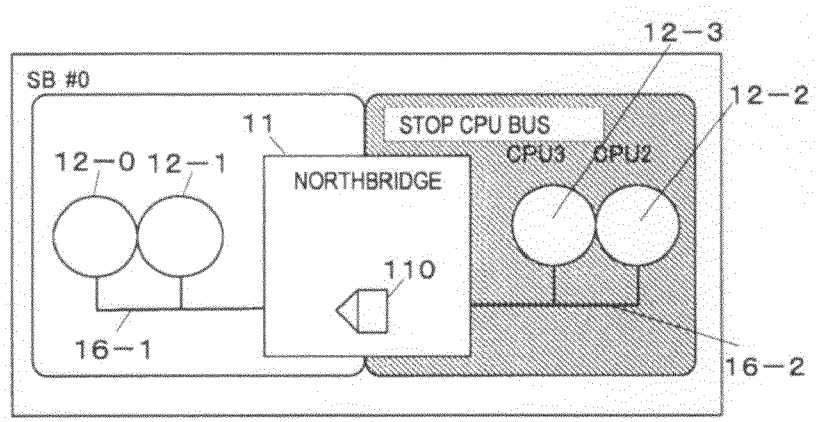
FIG. 8 is an exemplary diagram for explaining the overview of the resynchronization processing for the redundant CPUs according to the embodiment.

As illustrated in FIG. 7, the firmware instructs the CPU 12-0 and the CPU 12-1 to writes out cache data in the CPU 12-0 and cache data in the CPU 12-1 to the memory 15-1 and save the cache data on the memory 15-1.

At a point when the write-out of cache data to the memory 15-1 is completed for all the normal CPUs (the CPU 12-0 and the CPU 12-1), the firmware instructs the northbridge 11 to clear cache state information of each of the CPUs held by a snoop tag (a snoop tag 110 in FIG. 8) included in the northbridge 11. The snoop tag 110 is storing means for storing cache state information on the inside of the CPUs connected to the northbridge 11. The cache state information indicates a state of caches included in a CPU; the cache state information, for example, is information indicating whether the home CPU stores the data stored in the memory 15-1 in a cache thereof and indicating in what kind of state the home CPU stores, in the cache, data stored in a memory of which system board.

Figure 9:
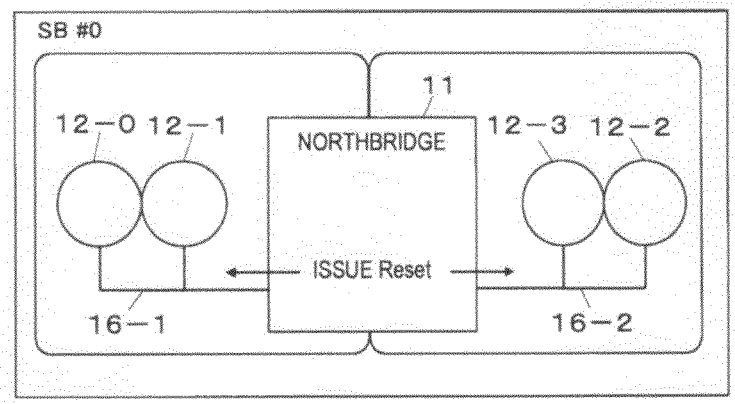
FIG. 9 is an exemplary diagram for explaining the overview of the resynchronization processing for the redundant CPUs according to the embodiment.

As illustrated in FIG. 9, the northbridge 11 simultaneously issues Reset to the CPUs (the CPU 12-0, the CPU 12-1, the CPU 12-2, and the CPU 12-3) connected to the northbridge 11, initializes the CPUs, and resumes the synchronous operation of the redundant CPUs. The Reset is a control signal for initializing the CPUs.

The firmware performs initialization of the CPUs and restores, in the CPU pairs, the inside information of the CPUs saved on the memory 15-1 in the saving processing for the inside information of the CPUs on the memory 15-1.

Figure 10:
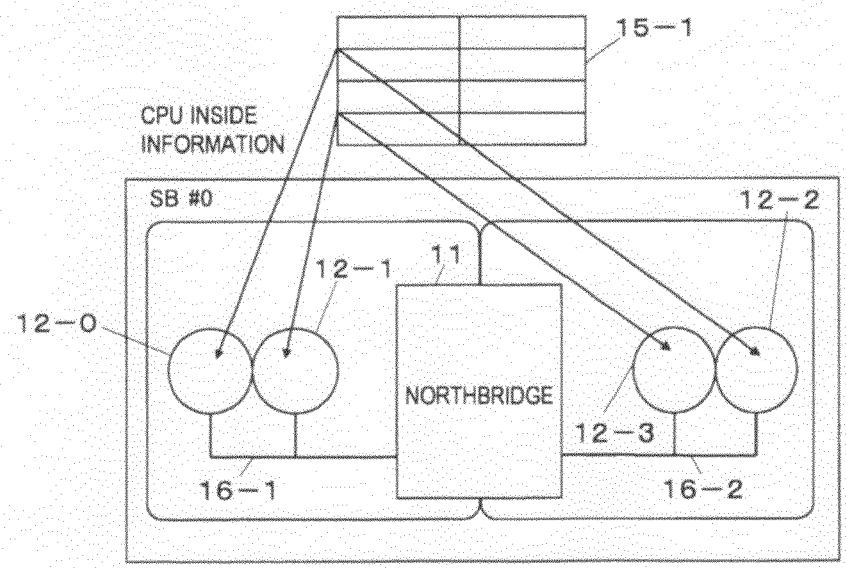
FIG. 10 is an exemplary diagram for explaining the overview of the resynchronization processing for the redundant CPUs according to the embodiment.

Specifically, the CPU 12-0 and the CPU 12-2 illustrated in FIG. 10 receive an instruction from the firmware and restore the inside information of the CPU 12-0 saved on the memory 15-1 on the home CPUs. The CPUs 12-1 and the CPU 12-3 illustrated in FIG. 10 receive an instruction from the firmware and restores the inside information of the CPU 12-1 saved on the memory 15-1 on the home CPUs. In other words, a part of the firmware is restoring means for restoring the inside information of the normal CPUs saved on the storing device in the initialized abnormality occurring CPU and the normal CPU.

The CPU pairs are reset to the redundant configuration according to the restoration processing of the inside information of the CPUs stored in the memory 15-1 to the CPU pairs.

Figure 11:
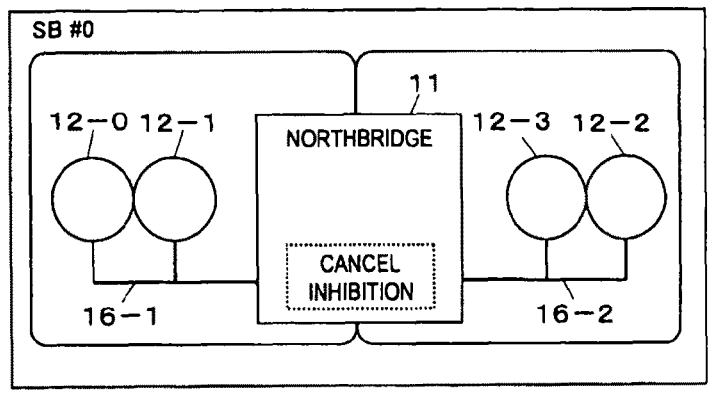
FIG. 11 is an exemplary diagram for explaining the overview of the resynchronization processing for the redundant CPUs according to the embodiment.

When the initialization and the restoration of the inside information are completed in all the CPUs connected to the northbridge 11, as illustrated in FIG. 11, the firmware instructs the northbridge 11 to cancel the inhibition of the input of the external instruction. Specifically, the firmware causes the northbridge 11 to stop inputting Retry to the global address cross bar 5-1 to thereby cancel the inhibition of the input of the external instruction.

The northbridge 11 cancels the inhibition of the input of the external instruction, whereby the CPU pairs (the pair of the CPU 12-0 and the CPU 12-2 and the pair of the CPU 12-1 and the CPU 12-3) resume the synchronous operation (resynchronization of the redundant CPUs is realized).

Figure 12:
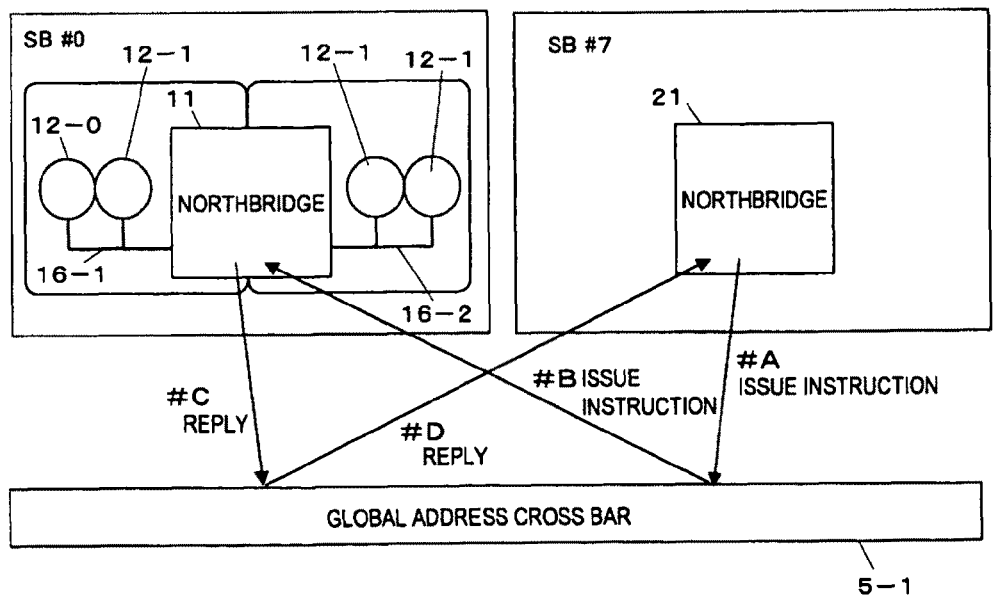
FIG. 12 is an exemplary diagram for explaining the overview of the resynchronization processing for the redundant CPUs according to the embodiment.

For example, as illustrated in FIG. 12, when an instruction is issued from the northbridge 21 included in the SB#7 (see #A in FIG. 12) and the instruction is transferred from the global address cross bar 5-1 to the northbridge 11 (see #B in FIG. 12), the northbridge 21 that receives the instruction replies to the northbridge 21 through the global address cross bar 5-1 that execution of the instruction is possible (see #C and #D in FIG. 12). The received instruction is executed by the redundant CPUs.

According to an example of this embodiment, an upper limit value of the number of times of execution of the resynchronization of the redundant CPUs is stored in the storing means in the northbridge 11 in advance. As explained above with reference to FIG. 3, when the issuance of the instruction from the abnormal CPU to the device on the outside of the northbridge 11 is stopped, the firmware determines whether the number of times of execution of the resynchronization of the redundant CPUs (the number of times the synchronous operation is resumed) is equal to or larger than the upper limit value of the number of times of execution of the resynchronization of the redundant CPUs stored in the storing means. When the firmware determines that the number of times of execution of the resynchronization of the redundant CPUs is equal to or larger than the upper limit value, the firmware continues the operation of only the normal CPU bus (e.g., the CPU bus 16-1) and the CPUs (e.g., the CPU 12-0 and the CPU 12-1) connected to the normal CPU bus and performs continuous operation of the system without carrying out the resynchronization processing for the redundant CPUs. Specifically, a part of the firmware is determining means for determining, when the issuance of the instruction of the abnormal CPU is stopped, whether the number of times the synchronous operation of the CPUs is resumed is equal to or larger than a predetermined number of times and causing, when the number of times the synchronous operation is resumed is equal to or larger than the predetermined number of times, restoring mean to restore the inside information saved in the storing device only in the normal CPUs.

Figure 13:
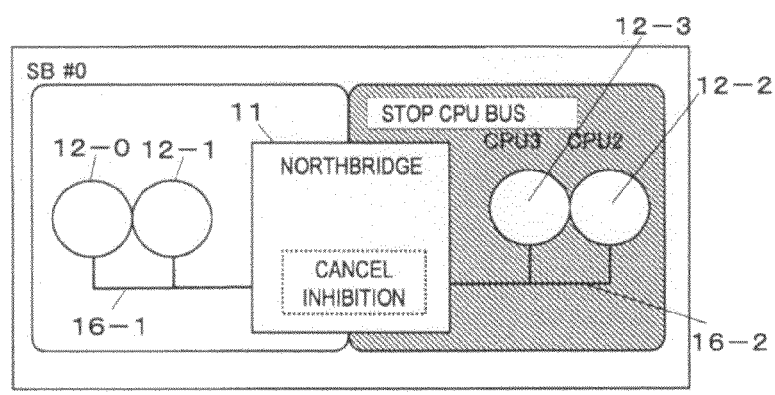
FIG. 13 is an exemplary diagram for explaining the overview of the resynchronization processing for the redundant CPUs according to the embodiment.

According to an example of this embodiment, before the initialization of the CPUs and the restoration processing for the inside information explained above with reference to FIG. 10 are completed for all the CPUs, when an error occurs in the abnormality occurring CPU and redundancy break (synchronization break) of the redundant CPUs occurs again, the firmware instructs the northbridge 11 to suspend the resynchronization processing for the redundant CPUs (i.e., suspend the restoration of the inside information in the abnormality occurring CPU) and resume operation of only the normal CPUs, the inside information of which is restored, and the normal CPU bus (one system operation) to which the normal CPUs are connected and instructs the northbridge 11 to cancel the inhibition of an external instruction. As a result, for example, as illustrated in FIG. 13, although the operation of the CPU bus 16-2 is kept in the stopped state, the operation of the CPU bus 16-1 changes to an operation state and the inhibition of an external instruction by the northbridge 11 is canceled. Specifically, the firmware is restoration suspending means for suspending, when abnormality in the abnormal occurring CPU is detected again while the inside information saved on the memory 15-1 is restored in the abnormality occurring CPU and the normal CPUs, the inside information of which saved on the memory 15-1 is initialized, the restoration of the inside information in the abnormality occurring CPU, resuming the operation of only the normal CPUs, the inside information of which is restored, and canceling the inhibition of an instruction issued to the system board (the SB#0).

Figure 14:
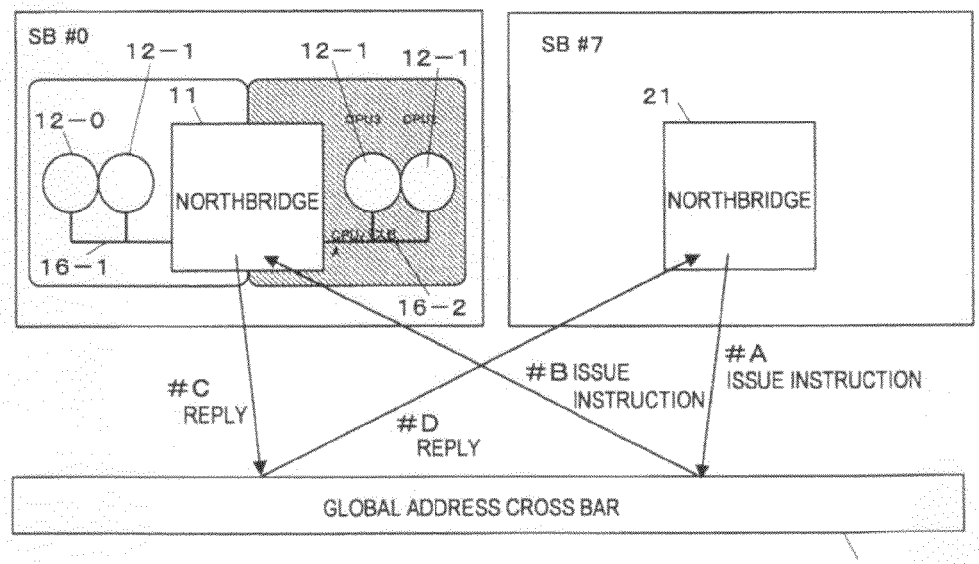
FIG. 14 is an exemplary diagram for explaining the overview of the resynchronization processing for the redundant CPUs according to the embodiment.

The northbridge 11 cancels the inhibition of the input of an external instruction, whereby, for example, as illustrated in FIG. 14, an instruction is issued from the northbridge 21 included in the SB#7 (see #A in FIG. 14) and the instruction is issued from the global address cross bar 5-1 to the northbridge 11 (see #B in FIG. 14). The northbridge 11 replies to the northbridge 21 through the global address cross bar 5-1 that execution of the instruction is possible (see #C and #D in FIG. 14).

Figure 15:
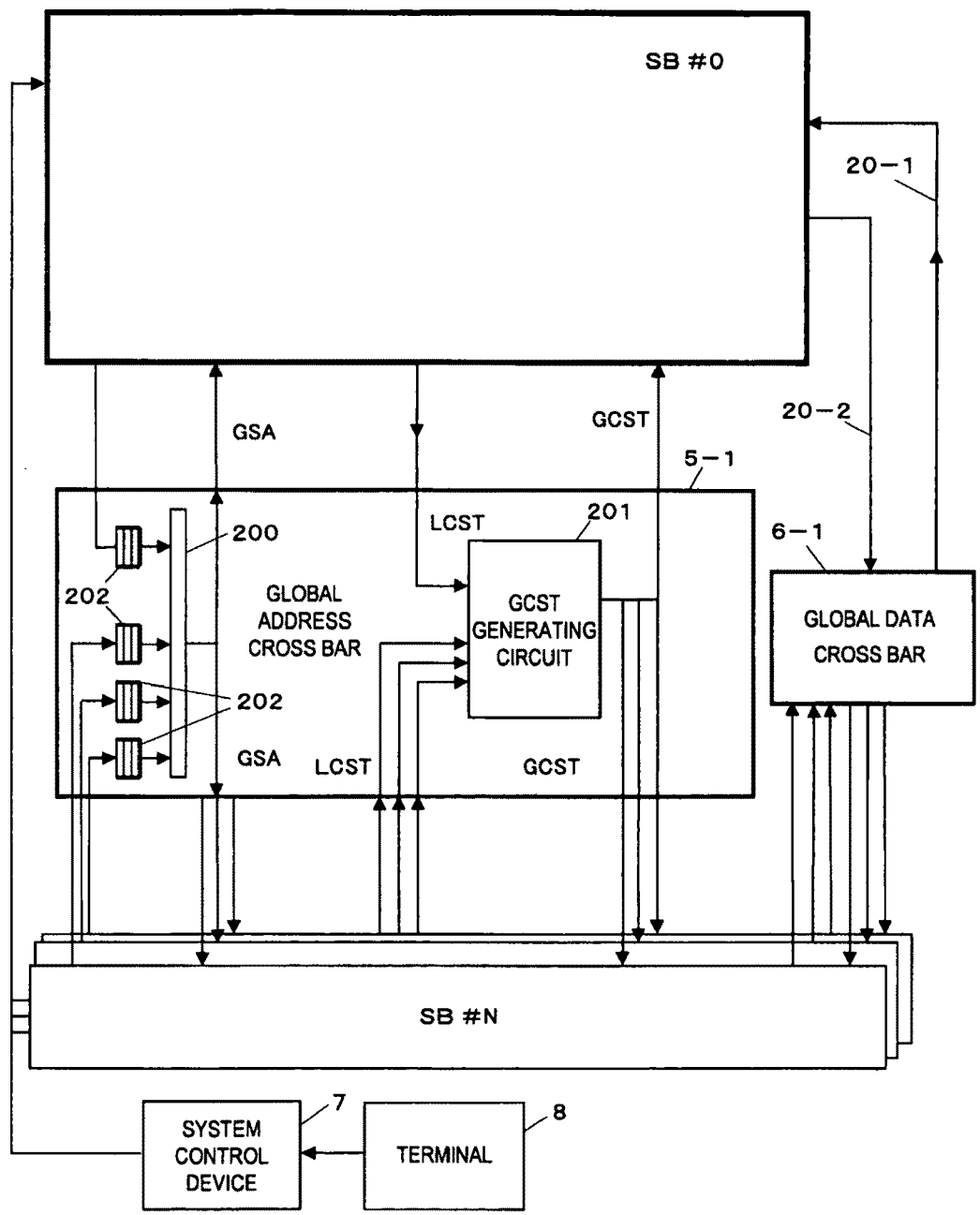
FIG. 15 is an exemplary diagram illustrating a system configuration example according to an example of the embodiment.
Figure 16:
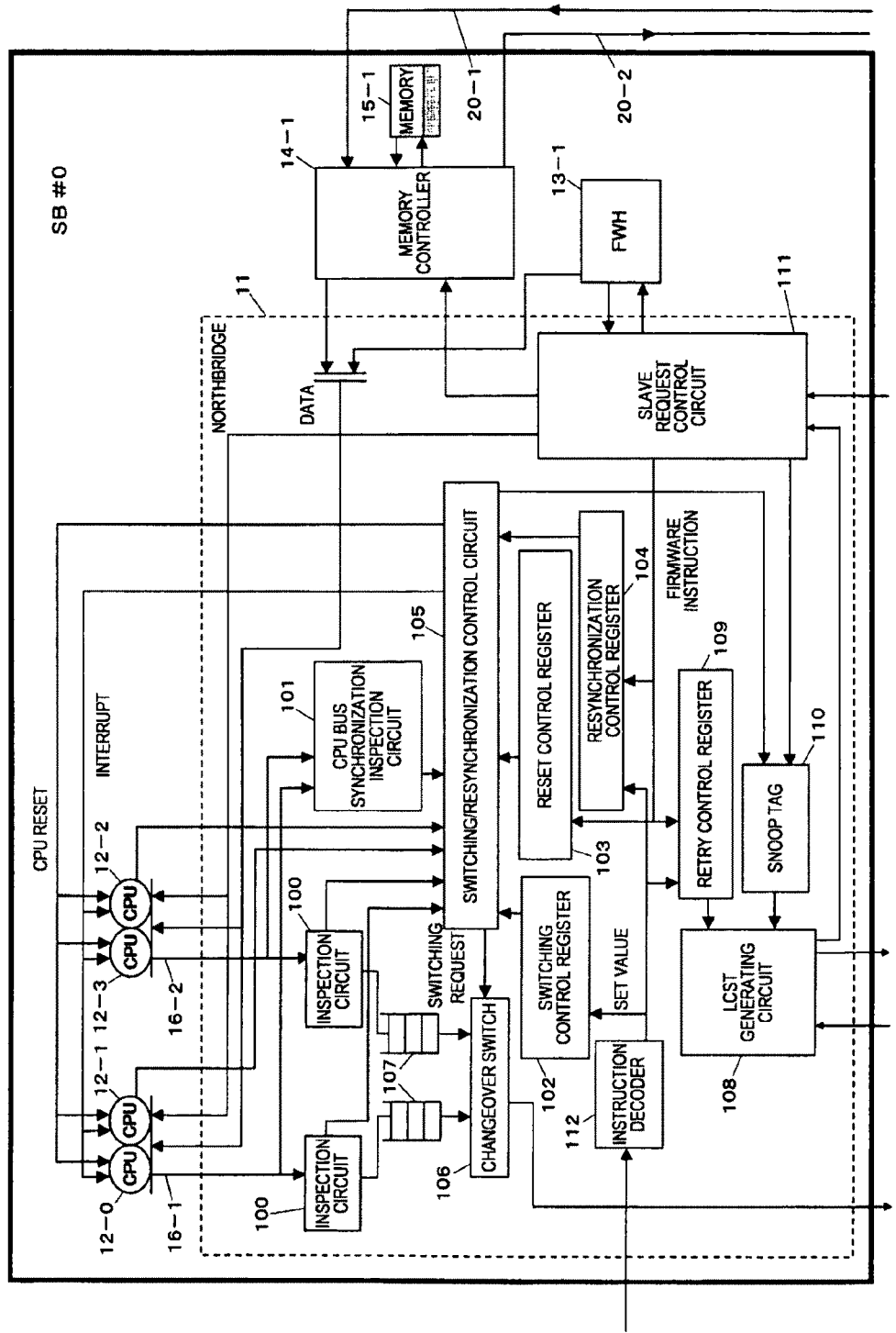
FIG. 16 is an exemplary diagram showing a configuration example of a SB#0.

FIG. 15 is a diagram illustrating a system configuration example according to this embodiment. FIG. 16 is a diagram illustrating a configuration example of the SB#0 illustrated in FIG. 15. In the example illustrated in FIGS. 15 and 16, the information processing apparatus according to this embodiment includes a SMP (Symmetric Multiple Processor) and is configured as a resynchronization system for redundant CPUs in a multiprocessor system.

The information processing apparatus according to this embodiment illustrated in FIG. 15 is configured by connecting the plural system boards (SB#0 to SB#N) mounted with the plural CPUs (e.g., the CPU 12-0 to the CPU 12-3 in FIG. 16) and the memory (e.g., the memory 15-1 in FIG. 16) via the global address cross bar 5-1 and the global data cross bar 6-1.

As explained later, the CPUs 12-0 and 12-2 and the CPUs 12-1 and 12-3 included in the SB#0 illustrated in FIG. 16 are respectively pairs of CPUs configured in redundancy by synchronous operation (redundant CPUs). The global address cross bar 5-1 is address relaying means for relaying an instruction issued from each of the system boards and an address as a target of the instruction to the other system boards. Each of the system boards has a configuration same as that of the SB#0 illustrated in FIG. 16. Specifically, the information processing apparatus according to this embodiment is a multiprocessor system including redundant CPUs as CPU pairs respectively configured in redundancy by the synchronous operation and including plural system boards connected via the address relaying means for relaying an instruction and an address as a target of the instruction.

A system control device 7 connected to a terminal 8, which interacts with a system administrator, is connected to the information processing apparatus. The system control device 7 issues, according to a control signal input from the terminal 8, an instruction to the northbridge (e.g., the northbridge 11 in FIG. 16) included in each of the system board and performs management of the entire system such as setting of a configuration of a partition and setting of an operation mode of the northbridge. The partition is a system including a combination of a system board and an I/O unit (not illustrated in FIGS. 15 and 16).

The SB#0 as one of the system boards included in the information processing apparatus illustrated in FIG. 15 includes, as illustrated in FIG. 16, the CPUs 12-0 to 12-3 and the memory 15-1 and includes the northbridge 11, the FWH 13-1, and the memory controller 14-1. The CPUs 12-0 and 12-2 and the CPUs 12-1 and 12-3 are respectively pairs of CPUs configured in redundancy by the synchronous operation (redundant CPUs). The CPU 12-0 and the CPU 12-2 are connected to the CPU bus 16-1 and the CPU 12-1 and the CPU 12-3 are connected to the CPU bus 16-2.

The northbridge 11 illustrated in FIG. 16 is a processing unit same as the northbridge 11 illustrated in FIG. 1. The memory controller 14-1 performs control of the memory 15-1. A specific function of the memory controller 14-1 is explained later. The FWH 13-1 is the same as the FWH 13-1 illustrated in FIG. 1. A specific function of the FWH 13-1 is explained later.

Each of the system boards (e.g., the SB#0) included in the information processing apparatus illustrated in FIG. 15 generates a local request address packet (hereinafter referred to as LRA packet) 202 including an instruction issued by a CPU mounted on the home system board and an address (address/opecode) as a target of the instruction and inputs the LRA packet 202 to the global address cross bar 5-1. The LRA packet 202 includes information such as an opecode (operation code), an address, a packet ID, a board ID, the number of times of retry information, and partition information (e.g., identification information of a partition). The ID is identification information of the LRA packet 202 and the board ID is identification information (e.g., a board number) of the system board as an issue source of the LRA packet 202.

When the global address cross bar 5-1 receives input of LRA packets 202 illustrated in FIG. 15, a global address priority control circuit 200 included in the global address cross bar 5-1 selects, on the basis of priority order determined in advance, a specific LRA packet 202 as a global select address packet (hereinafter referred to as GSA packet) out of the input LRA packets 202. The global address priority control circuit 200 broadcasts the GSA packet to all the system boards. The global address priority control circuit 200 may broadcast the GSA packet to all the system board in the same partition.

The GSA packet is a packet for notifying the system boards of an address/opecode that should be executed by the system. The GSA packet includes information same as the information included in the LRA packet 202.

When an LCST generating circuit (e.g., an LCST generating circuit 108 in FIG. 16) included in each of the system boards receives the GSA packet, the LCST generating circuit transmits a local cache state packet (hereinafter referred to as LCST packet) to the global address cross bar 5-1. The LCST packet is a packet including processing possibility information and data state information and used for notifying the global address cross bar 5-1 of the processing possibility information and the data state information. The processing possibility information indicates whether the home system board can continue execution of processing instructed by an instruction included in the GSA packet (an address/opecode included in the GSA packet) or the system board as an issue source of the instruction is instructed to perform the Retry. The data state information indicates where in the home system board the system board stores data corresponding to the address included in the GSA packet in what kind of state.

When the global address cross bar 5-1 receives the LCST packet from the LCST generating circuit included in each of the system boards, a GCST generating circuit 201 included in the global address cross bar 5-1 illustrated in FIG. 15 generates a global cache state packet (hereinafter referred to as GCST packet) and broadcasts the GCST packet to all the system boards. The GCST generating circuit 201 may broadcast the GCST packet to the system boards in the same partition. The GCST packet is a packet for notifying the processing possibility information and the data state information included in the LCST packet notified from each of the system boards to the global address cross bar to all the system boards.

The GCST generating circuit 201 transmits the GCST packet to a slave request control circuit (e.g., a slave request control circuit 111 illustrated in FIG. 16) in the northbridge included in each of the system boards (e.g., the northbridge 11 included in the SB#0 illustrated in FIG. 16). For example, the slave request control circuit 111 illustrated in FIG. 16 receives the GCST packet from the GCST generating circuit illustrated in FIG. 15 and converts the GCST packet into a control signal for the memory controller 14-1 (a memory slave request), a control signal for the CPUs (a CPU slave request), and a control system for the FWH 13-1 (an FWH slave request). The slave request control circuit 111 transmits the memory slave request to the memory controller 14-1, transmits the CPU slave request to the CPUs, transmits the FWH slave request to the FWH 13-1, and causes the home system board to execute an instruction that the home system board should execute.

The information processing apparatus according to this embodiment realizes, for example, according to the operation explained above, symmetrical and uniform allocation of processing to the CPUs in all the system boards.

Next, as an exemplary configuration of the northbridges included in the system boards, a configuration of the northbridge 11 included in the SB#0 is explained.

As illustrated in FIG. 16, the northbridge 11 includes an inspection circuit 100, a CPU bus synchronization inspection circuit 101, a switching control register 102, a reset control register 103, a resynchronization control register 104, a switching/resynchronization control circuit 105, a changeover switch 106, a master queue 107, an LCST generating circuit 108, a retry control register 109, a snoop tag 110, a slave request control circuit 111, and an instruction decoder 112.

The inspection circuit 100 receives packets transmitted from the CPUs (the CPU 12-0, the CPU 12-1, the CPU 12-2, and the CPU 12-3) via the CPU buses 16-1 and 16-2 performs inspection of ECC, parity, and the like. When the inspection circuit 100 detects an error in the inspection, the inspection circuit 100 performs error notification to the switching/resynchronization control circuit 105.

The CPU bus synchronization inspection circuit 101 performs synchronization inspection in a unit of a CPU bus to which pair of CPUs included in redundant CPUs is connected. Specifically, the CPU bus synchronization inspection circuit 101 inspects whether the pair of CPUs included in the redundant CPUs performs the synchronous operation. When the CPU bus synchronization inspection circuit 101 detects a synchronization break, the CPU bus synchronization inspection circuit 101 performs error notification to the switching/resynchronization control circuit 105. When an error is detected in the CPU, the CPU in which the error is detected performs error notification (internal error notification) to the switching/resynchronization control circuit 105.

The inspection circuit 100 and the CPU bus synchronization inspection circuit 101 are synchronization break detecting means for detecting abnormality, which occurs in any one of the CPUs included in the redundant CPUs, to thereby detect a synchronization break.

An operation mode of the switching/resynchronization control circuit 105 at the time when an error is detected by the CPU bus synchronization inspection circuit 101 is set in the switching control register 102. The system control device 7 sets the operation mode in advance in the switching control register 102 via the instruction decoder 112. For example, in the switching control register 102, as an operation mode 1, stop of a partition including a northbridge in which an error is detected is set. As an operation mode 2, invalidity of the CPU bus 16-1 is set. As an operation mode 3, invalidity of the CPU bus 16-2 is set.

The reset control register 103 is a register that manages states of the CPUs in order to perform reset control for the CPUs. For example, during resynchronization processing for the redundant CPUs, when saving of cache data of a CPU on the memory 15-1 is completed, a saving completion flag corresponding to the CPU is set in the reset control register 103 according to control by the firmware stored in the FWH 13-1:

The resynchronization control register 104 is a register in which an upper limit value of the number of times of execution of resynchronization of the redundant CPUs (a resynchronization possible upper limit value) and a resynchronization possibility flag are set. The resynchronization possibility flag is a flag indicating whether the resynchronization of the redundant CPUs is possible. The system control device 7 sets the resynchronization possible upper limit value in the resynchronization control register 104 via the instruction decoder 112.

According to the embodiment of the present invention, the firmware stored in the FWH 13-1 performs comparison of the number of times of execution of resynchronization and the resynchronization possible upper limit value set in the resynchronization control register 104. When the number of times of execution of resynchronization is smaller than the resynchronization possible upper limit value, the firmware determines that resynchronization of the redundant CPUs is possible and sets, for example, a flag 1 in the resynchronization control register 104 as the resynchronization possibility flag. When the number of times of execution of resynchronization is equal to or larger than the resynchronization possible upper limit value, the firmware determines that resynchronization of the redundant CPUs is not possible and sets, for example, a flag 0 as the resynchronization possibility flag.

The switching/resynchronization control circuit 105 is a circuit that receives error notification from the CPUs, the inspection circuit 100, and the CPU bus synchronization inspection circuit 101, and controls the operation of the changeover switch 106. The switching/resynchronization control circuit 105 performs switching control explained below.

When the switching/resynchronization control circuit 105 receives internal error notification from a CPU, the switching/resynchronization control circuit 105 invalidates a CPU bus to which the CPU (one system CPU) in which an error occurs and stops issuance of an instruction from the CPU bus to the global address cross bar 5-1. When the switching/resynchronization control circuit 105 receives error notification from the inspection circuit 100, the switching/resynchronization control circuit 105 invalidates a CPU bus in which an error is detected and stops issuance of an instruction from the CPU bus to the global address cross bar 5-1. When the switching/resynchronization control circuit 105 receives error notification from the CPU bus synchronization inspection circuit 101, the switching/resynchronization control circuit 105 performs operation corresponding to an operation mode set in the switching control register 102. In other words, the switching/resynchronization control circuit 105 is instruction issuance stopping means for stopping issuance of an instruction from a CPU in which abnormality is detected to a device on the outside of the SB#0.

The switching/resynchronization control circuit 105 interrupts a CPU connected to a normal CPU bus with the reception of the error notification as an opportunity. The CPU is allocated to the firmware by the interrupt processing.

The switching/resynchronization control circuit 105 monitors the reset control register 103 and, when it is confirmed that the saving completion flag is set for all the CPUs, issues a Reset to all the CPUs. In other words, the switching/resynchronization control circuit 105 is initializing means for performing initialization of the abnormality occurring CPU, in which abnormality occurs, and the normal CPU.

For example, when an error occurs in the abnormality occurring CPU during the resynchronization processing for the redundant CPUs and redundancy break (synchronization break) of the redundant CPUs occurs again, the switching/resynchronization control circuit 105 receives an instruction from the firmware and validates only the normal CPU bus such that only an instruction issued through the normal CPU is input to the global address cross bar 5-1.

The changeover switch 106 performs switching of a CPU bus according to an instruction of the switching/resynchronization control circuit 105. The changeover switch 106 performs the switching of the CPU bus, whereby, for example, it is determined an instruction issued through which of the CPU bus 106-1 and the CPU bus 106-2 is input to the global address cross bar 5-1 as the LRA packet 202.

The master queue 107 converts an instruction issued by a CPU into a LRA packet 202 of the chip set and stores the LRA packet 202. The master queue 107 inputs the stored LRA packet 202 to the global address cross bar 5-1 through the changeover switch 106. The LRA packet 202 is stored in the master queue 107 until the instruction is completed. When Retry occurs during execution of the instruction (i.e., when Retry of an instruction issued by the home system board is instructed from a system board other than the home system board), the LRA packet 202 is re-input to the global address cross bar 5-1.

The LCST generating circuit 108 receives a GSA packet from the global address cross bar 5-1, generates an LCST packet, and inputs the generated LCST packet to the global address cross bar 5-1. Specifically, when the LCST generating circuit 108 receives a GSA packet, the LCST generating circuit refers to the retry control register 109 and checks whether an in-resynchronization flag explained later is set in the retry control register 109. When the in-resynchronization flag is set in the retry control register 109, the LCST generating circuit 108 generates processing possibility information indicating that an issue source of an instruction included in the GSA packet is instructed to perform Retry. When the in-resynchronization flag is not set in the retry control register 109, the LCST generating circuit 108 receives the instruction included in the GSA packet, notifies the slave request control circuit 111 of the received instruction as an instruction that the home system board (SB#0) is to execute, and generates processing possibility information indicating that the home system board can continue the execution of the instruction included in the GSA packet.

The LCST generating circuit 108 generates the data state information with reference to the snoop tag 110. The LCST generating circuit 108 generates an LCST packet including the generated processing possibility information and data state information and inputs the LCST packet to the global address cross bar 5-1.

The retry control register 109 is a register in which information indicating whether the resynchronization processing is performed for the CPUs of the home system board is stored. When the resynchronization processing for the CPUs of the home system board is started, in order to inhibit instructions issued from the other system board to the home system board, the in-resynchronization flag is set in the retry control register 109 according to an instruction of the firmware. When inside information is restored in all the CPUs including one system CPU (the abnormal CPU) and the normal CPUs in the home system board, the firmware instructs the northbridge 11 to cancel the inhibition of external instructions. Then, the in-resynchronization flag of the retry control register 109 is set to invalid.

As explained above, when the in-resynchronization flag is set in the retry control register 109, the LCST packet including the processing possibility information indicating that Retry is instructed is generated and input to the global address cross bar 5-1 by the LCST generating circuit 108. In other words, the firmware and the LCST generating circuit 108 are instruction inhibiting means for inhibiting an instruction issued from the device on the outside of the SB#0 (e.g., the SB#N illustrated in FIG. 15) to the SB#0.

The in-resynchronization flag is set to invalid in the retry control register 109, whereby the LCST generating circuit 108 receives the instruction included in the GSA packet received from the global address cross bar 5-1. As a result, it is possible to cause the redundant CPUs to execute the received instruction and resume synchronization operation of the redundant CPUs. In other words, the firmware is instruction inhibition canceling means for canceling, when the inside information is restored in the abnormality occurring CPU and the normal CPUs, inhibition of the instruction issued to the system board (e.g., SB#0) and resuming synchronization operation of the abnormal occurring CPU and the normal CPUs.

The snoop tag 110 is storing means for storing state information of a cache line in a CPU (cache state information). The slave request control circuit 111 explained later updates the cache state information in the snoop tag.

The slave request control circuit 111 receives a GCST packet from the global address cross bar 5-1 and generates a memory slave request, a CPU slave request, and an FWH slave request on the basis of information included in the GCST packet and the instruction, which the home system board (SB#0) is to execute, notified from the LCST generating circuit 108. The slave request control circuit 111 transmits the memory slave request to the memory controller 14-1, transmits the CPU slave request to the CPUs, and transmits the FWH slave request to the FWH 13-1. The slave request control circuit 111 updates stored contents of the retry control register 109, the snoop tag 110, the resynchronization control register 104, and the reset control register 103 according to an instruction of the firmware stored in the FWH 13-1.

For example, an error occurs in the abnormality occurring CPU during the resynchronization processing for the redundant CPUs and redundancy break (synchronization break) of the redundant CPUs occurs again, the northbridge 11 stops again the operation of the CPU bus to which the abnormality occurring CPU is connected. Consequently, the slave request control circuit 111 receives an instruction of the firmware and transmits the CPU slave request to all the CPUs. However, the CPU slave request is executed in only the normal CPU.

The instruction decoder 112 decodes an instruction issued from the system control device 7 to the northbridge 11, sets, according to a decode result of the instruction, board numbers of the system boards and partitions to which the system boards belong, and writes set values in and reads out set values from the switching control register 102, the retry control register 109, and the resynchronization control register 104. The instruction decoder 112 performs, for example, setting of an operation mode of the switching/resynchronization control circuit 105 in the switching control register 102 or readout of an operation mode from the switching control register 102. The instruction decoder 112 reads out, from the retry control register 109, information indicating whether the in-resynchronization flag is set. The instruction decoder 112 performs setting of a resynchronization possible upper limit value in the resynchronization control register 104 and readout of information indicating whether the resynchronization possibility flag is set from the resynchronization control register 104.

Next, functions of the memory controller 14-1 included in the SB#0 are explained. The memory controller 14-1 performs processing corresponding to content of a slave request transmitted from the slave request control circuit 111 in the northbridge 11. The memory controller 14-1 performs, for example, writing of data from a CPU into the memory 15-1. The memory controller 14-1 writes, for example, data transmitted from the system boards other than the SB#0 to the SB#0 through the global data cross bar 6-1 and a data bus 20-1 illustrated in FIG. 15 in the memory 15-1.

The memory controller 14-1 reads out data from the memory 15-1 and transmits the read-out data to the CPU according to an instruction of the firmware. The memory controller 14-1 reads out data from the memory 15-1 and transmits the read-out data to the system boards other than the SB#0 through a data bus 20-2 and the global data cross bar 6-1 illustrated in FIG. 15.

Next, functions of the FWH 13-1 included in the SB#0 are explained. The FWH 13-1 is a ROM in which the firmware is stored. The firmware stored in the FWH 13-1 has the various functions explained above (e.g., functions of the saving means, the restoring means, the determining means, the restoration suspending means, the instruction inhibiting means, and the instruction inhibition canceling means) and performs processing corresponding to content of an FWH slave request transmitted from the slave request control circuit 111. For example, the firmware performs transmission of data to a CPU.

Figure 17:
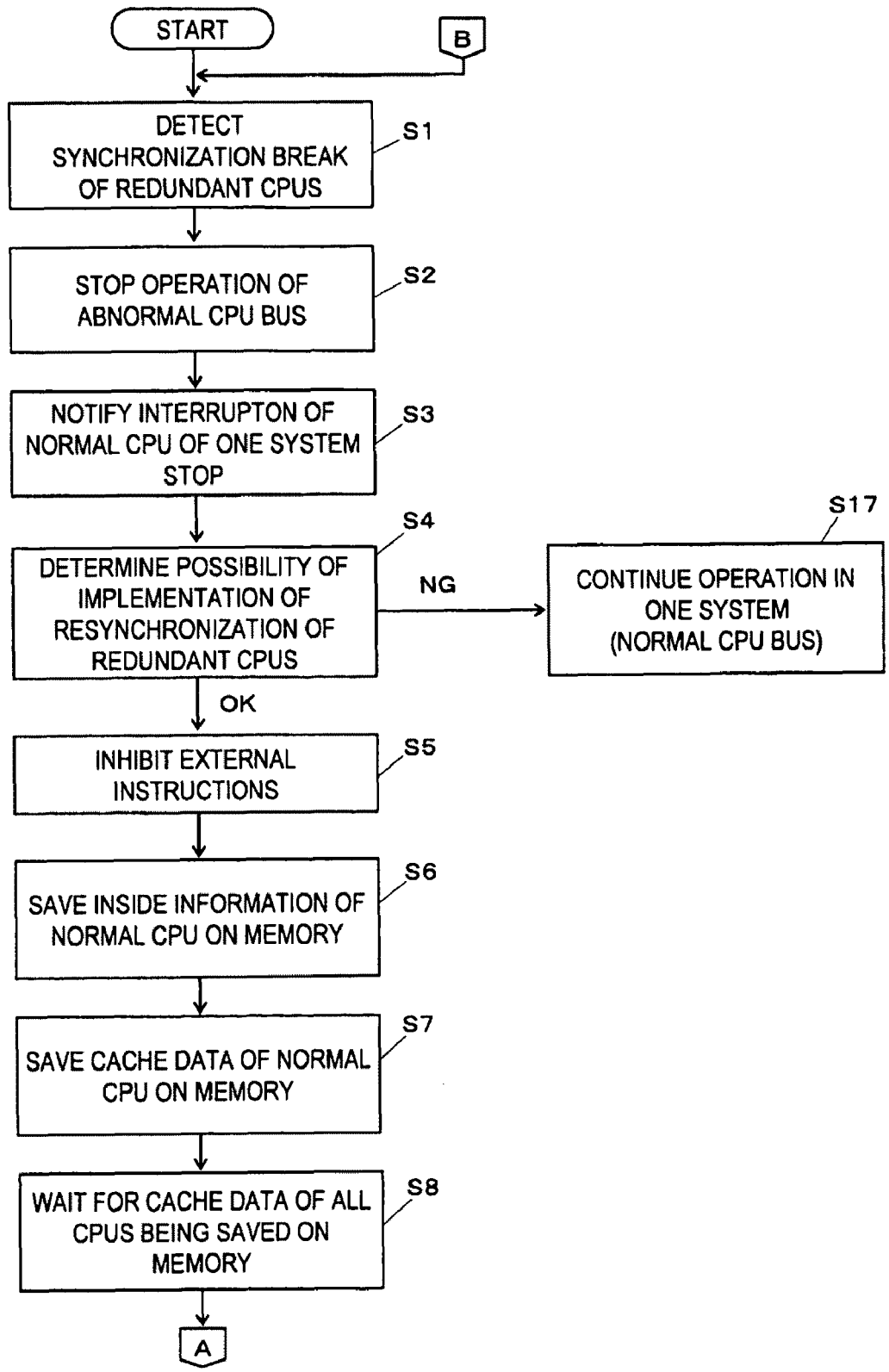
FIG. 17 is a diagram illustrating an example of a resynchronization processing flow for the redundant CPUs according to the embodiment.
Figure 18:
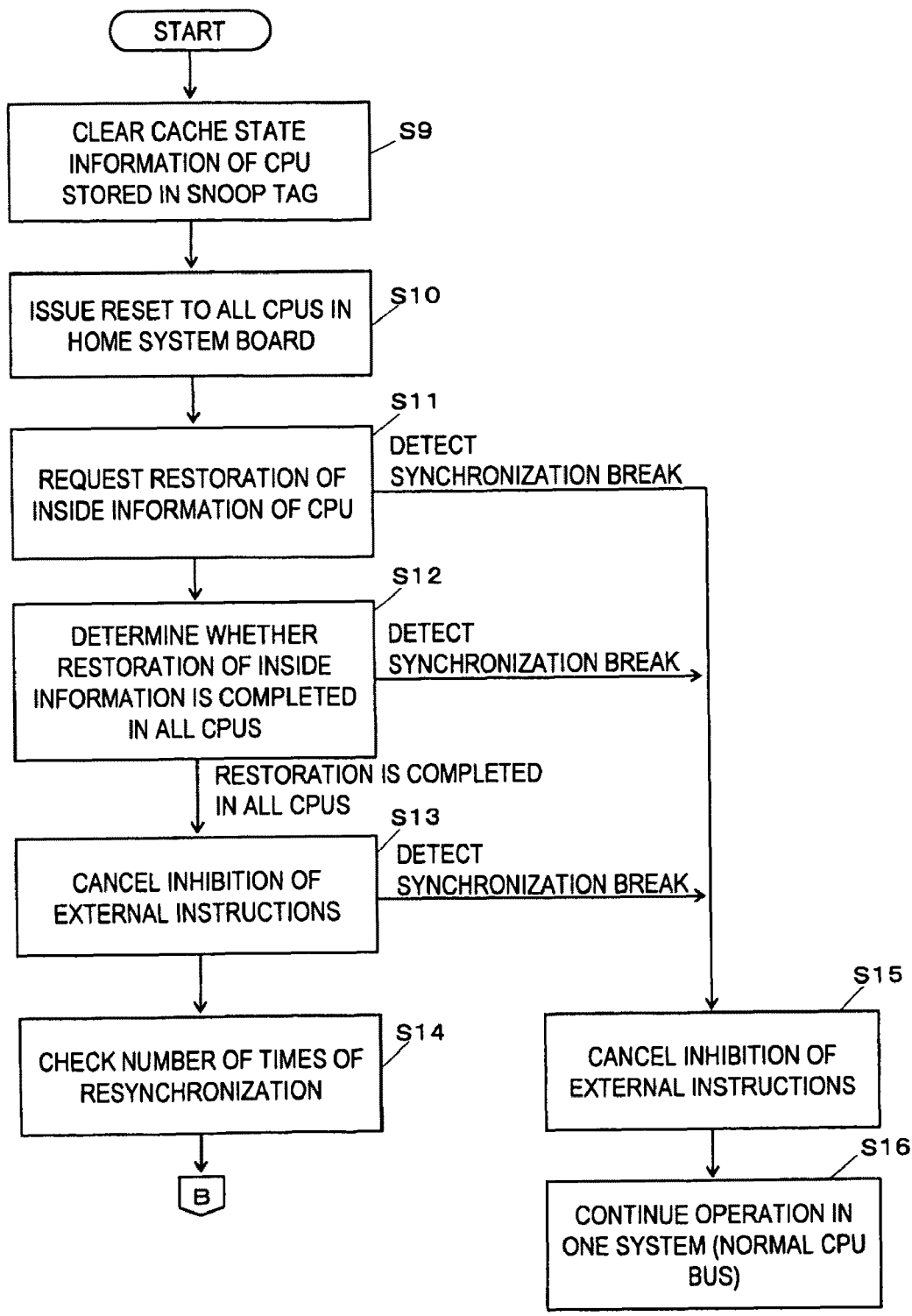
FIG. 18 is an exemplary diagram illustrating an example of the resynchronization processing flow for the redundant CPUs according to the embodiment.

Next, the operation of the present invention is explained with reference to FIGS. 15 to 18. FIGS. 17 and 18 are diagrams illustrating an example of a resynchronization processing flow of the redundant CPUs according to this embodiment.

First, the CPUs 12-0 and 12-2 and the CPUs 12-1 and 12-3 illustrated in FIG. 16 are respectively redundant CPUs configured in redundancy. The northbridge 11 monitors a synchronization break of the redundant CPUs. When error detection in the CPUs, error detection by the inspection circuit 100, or error detection by the CPU bus synchronization inspection circuit 101 is performed, error notification to the switching/resynchronization control circuit 105 is performed. In the step S1 in FIG. 17, the switching/resynchronization control circuit 105 detects a synchronization break of the redundant CPUs (step S1). For example, when an error occurs in the CPU 12-2 in FIG. 16 and a synchronization break of the redundant CPUs is detected, the switching/resynchronization control circuit 105 stops the operation of an abnormal CPU bus (e.g., the CPU bus 16-2) to which the CPU 12-2, in which the error occurs, is connected (step S2). In the step S2, for example, when an error in a CPU or an error by the inspection circuit 100 is detected, the switching/resynchronization control circuit 105 invalidates the CPU bus in which the error occurs. When error detection by the CPU bus synchronization inspection circuit 101 is performed, the switching/resynchronization control circuit 105 invalidates the abnormal CPU bus according to set content of the switching control register 102.

Subsequently, when the stop of the operation of the abnormal CPU bus is completed, the switching/resynchronization control circuit 105 interrupt-notifies CPUs (normal CPUs) connected to valid CPU buses of the home system board that the abnormality occurs in the CPU bus (e.g., stop of the CPU bus 16-2) (step S3). When the interrupt notification to the normal CPUs is completed, the firmware determines, with reference to the resynchronization possibility flag set in the resynchronization control register 104, if it is possible to carry out resynchronization of the redundant CPUs (step S4).

When the firmware determines that the resynchronization of the redundant CPUs cannot be carried out (NG), the firmware instructs the switching/resynchronization control circuit 105 to validate the operation of the normal CPU bus and continue the operation in the normal CPU bus (step S17). When the firmware determines that it is possible to carryout the resynchronization of the redundant CPU (OK), the firmware instructs the northbridge 11 to inhibit external instructions (step S5). Specifically, the slave request control circuit 111 sets the in-resynchronization flag in the retry control register 109 according to an instruction of the firmware. The firmware sets the in-resynchronization flag in the retry control register 109, whereby the LCST generating circuit 108 responds to a GSA packet received from the global address cross bar 5-1 illustrated in FIG. 15, generates an LCST packet including processing possibility information indicating that an issue source of an instruction included in the GSA packet is instructed to perform Retry, and inputs the LCST packet to the global address cross bar 5-1.

Therefore, Retry of an instruction to the home system board is repeated in the other system board as an issue source of the instruction. The LRA packet 202 issued by the other system board stays in a master queue in the other system board. As a result, all instructions issued from the other system board to the home system board after that are inhibited.

The firmware instructs normal CPUs connected to the normal CPU bus (e.g., the CPUs 12-0 and 12-1 connected to the CPU bus 16-1) to save inside information of the normal CPU on the memory 15-1 (step S6). In the step S6, for example, the normal CPU connected to the normal CPU bus inputs the LRA packet 202, which includes an instruction for saving inside information on the memory 15-1, to the global address cross bar 5-1 illustrated in FIG. 15. A series of processing including transmission of a GSA packet to the system boards by the global address cross bar 5-1 that receives the input of the LRA packet 202, input of LCST packets from the system boards to the global address cross bar 5-1, transmission of a GCST packet from the global address cross bar 5-1 to the system boards, and issuance of a slave request by slave request control circuits included in the system boards that receive the GCST packet is repeated. The inside information of the normal CPU is saved on the memory 15-1.

The firmware instructs the CPUs connected to the normal CPU bus (e.g., the CPUs 102-0 and 102-1 connected to the CPU bus 106-1) to save cache data stored in the normal CPUs on the memory 15-1 (step S7). In the step S7, further, the firmware sets, every time the saving of the cache data on the memory 15-1 is completed, a saving completion flag corresponding to a CPU from which cache data is saved in the reset control register 103.

The firmware waits for cache data of all the CPUs to be saved on the memory 15-1 (step S8). When all flags corresponding to the CPUs of the reset control register 103 are set and the cache data of all the CPUs are saved on the memory 15-1, in the step S9 of FIG. 18, the switching/resynchronization control circuit 105 clears cache state information of the CPUs stored in the snoop tag 110 (step S9). The switching/resynchronization control circuit 105 issues Reset to all the CPUs in the home system board (step S10).

Thereafter, the firmware requests all the CPUs to restore the inside information of the CPU saved on the memory 15-1 in step S6 of FIG. 17 (step S11). The CPUs (e.g., the CPU 12-2 and the CPU 12-3) connected to the abnormal CPU bus (e.g., the CPU bus 16-2) perform restoration of inside information of the CPUs using inside information of the normal CPUs (e.g., the CPU 12-0 and the CPU 12-1) as the pair of the redundant configuration. For example, the CPU 12-3 illustrated in FIG. 16 reads out inside information of the CPU 12-1 from the memory 15-1 and restores the inside information in the CPU. The CPU 12-2 reads out inside information of the CPU 12-0 from the memory 15-1 and restores the inside information in the CPU. The CPU 12-0 and the CPU 12-1 respectively read out inside information of the CPU 12-0 and inside information of the CPU 12-1 from the memory 15-1 and restore the inside information in the CPUs.

An exemplary procedure of the processing in the step S11 is explained. The CPUs requested to restore inside information by the firmware input the LRA packets 202 including restoration instructions for the inside information to the global address cross bar 5-1. A series of processing including transmission of a GSA packet to the system boards by the global address cross bar 5-1 that receives the input of the LRA packets 202, input of LCST packets to the global address cross bar 5-1 from the system boards, transmission of a GCST packet from the global address cross bar 5-1 to the system boards, and issuance of slave requests by slave request control circuits included in the system boards that receive the GCST packet is performed. The inside information of the normal CPUs is restored from the memory 15-1 into the CPUs.

The firmware determines whether restoration of the inside information is completed in all the CPUs (step S12). When the firmware determines that the restoration of the inside information is completed in all the CPUs, the firmware instructs the northbridge 11 to cancel inhibition of external instructions (step S13). Specifically, the firmware instructs the slave request control circuit 111 to set the in-resynchronization flag of the retry control register 109 to invalid. The in-resynchronization flag is set to invalid, whereby the LCST generating circuit 108 generates, in response to a GSA packet received from the global address cross bar 5-1, an LCST packet including processing possibility information indicating that the home system board can continue execution of an instruction included in a GSA packet. As a result, the home system board can receive instructions from the other system boards and cause the redundant CPUs to execute the instruction and the resynchronization of the redundant CPUs is completed.

When the cancel of the inhibition of external instructions is completed, the firmware checks the number of times of execution of resynchronization (step S14) and returns to the step S1 in FIG. 17. In the step S14 in FIG. 18, the firmware performs comparison of the number of times of execution of resynchronization and the resynchronization possible upper limit value set in the resynchronization control register 104. When the number of times of execution of resynchronization is smaller than the resynchronization possible upper limit value, the firmware determine that resynchronization of the redundant CPUs is possible and sets, for example, a flag 1 in the resynchronization control register 104 as a resynchronization possibility flag. When the number of times of execution of resynchronization is equal to or larger than the resynchronization possible upper limit value, the firmware determines that resynchronization of the redundant CPUs is not possible and sets, for example, a flag 0 in the resynchronization control register 104 as a resynchronization possibility flag.

When a synchronization break is detected during the restoration processing for the inside information of the CPU saved on the memory 15-1 (see the step S11), while the firmware waits for completion of restoration of inside information concerning all the CPUs (see the step S12), or while the northbridge 11 performs processing for canceling inhibition of external instructions (see the step S13), the northbridge 11 stops again the operation of the CPU bus to which the abnormality occurring CPU is connected. The firmware instructs the northbridge 11 to cancel the inhibition of external instructions (step S15). The firmware continues the operation in the normal CPU bus (step S16).

In the step S16, the firmware instructs the slave request control circuit 111 to transmit a CPU slave request to all the CPUs. However, since the CPU bus to which the abnormal CPU is connected is already in a stopped state, processing that the home system board should execute is executed by only the normal CPUs. The firmware instructs the switching/resynchronization control circuit 105 to validate only the normal CPU bus such that only an instruction issued through the normal CPU is input to the global address cross bar 5-1.

According to the embodiment of the present invention, the firmware may perform the check of the number of times of execution of resynchronization, which is performed in the step S14 of FIG. 18, in the processing in the step S4 of FIG. 17 rather than in the step S14. Specifically, in the step S4 of FIG. 17, the firmware determines whether the number of times of execution of resynchronization of the redundant CPUs is equal to or larger than the upper limit value of the number of times of execution of resynchronization of the redundant CPUs stored in the storing means in advance. When the firmware determines that the number of times of execution of resynchronization of the redundant CPUs is equal to or larger than the upper limit value of the number of times of execution of resynchronization of the redundant CPUs, the firmware proceeds to the step S17 of FIG. 17. When the firmware determines that the number of times of execution of resynchronization of the redundant CPUs is smaller than the upper limit value of the number of times of execution of resynchronization of the redundant CPUs, the firmware proceeds to the step S5 of FIG. 17.

When an information processing apparatus according to the present invention detects a synchronization break of redundant arithmetic processors (redundant CPUs) due to an error of any one of the redundant CPUs configured as redundant arithmetic processors, the information processing apparatus inhibits an instruction issued from a device on the outside to the home system, saves inside information and cache data of a normal CPU on a storing device such as a main memory connected to a northbridge. Then, the information processing apparatus according to the present invention resets the CPU in which the error occurs (hereinafter referred to as "abnormality occurring CPU") and the normal CPU and restores the inside information of the normal CPU saved on the storing unit in the reset abnormality occurring CPU and normal CPU. When the inside information is restored in the abnormality occurring CPU and the normal CPU, the information processing apparatus cancels the inhibition of the instruction issued from the device on the outside to the home system and resumes synchronous operation of the abnormality occurring CPU and the normal CPU to resynchronize the redundant CPUs. Therefore, according to the present invention, when a synchronization break among CPUs occurs, it is possible to perform resynchronization processing for the redundant CPUs without restarting an OS. Further, since the resynchronization processing for the redundant CPUs according to the present invention does not depend on functions of an OS operating on a system, it is possible to realize the resynchronization processing using a general-purpose OS.

For example, when it is stopped to issue an instruction from the abnormality occurring CPU to the device on the outside, the information processing apparatus according to the present invention determines whether the number of times of execution of resynchronization of the redundant CPUs equals to or exceeds an upper limit value of the number of times of execution of the resynchronization of the redundant CPUs. When it is determined that the number of times of execution of the resynchronization of the redundant CPUs equals to or exceeds the upper limit value of the number of times of execution of the resynchronization of the redundant CPUs, the information processing apparatus continues operation of only the normal CPU. Therefore, according to the present invention, when a permanent fault occurs in any one of the redundant CPUs, for example, it is possible to continue the operation of the normal CPU so that is can perform continuous operation that makes full use of CPU resources mounted on the system.

Furthermore, when an error is detected again in the abnormality occurring CPU while the inside information of the normal CPU saved on the storing device is being restored in the reset abnormality occurring CPU and normal CPU, the information processing apparatus according to the present invention suspends the restoration of the inside information into the abnormality occurring CPU, resumes operation of the normal CPU in which the inside information has been restored, and cancels the inhibition of the instruction issued from the device on the outside to the home system. Therefore, according to the present invention, when an error occurs again in the abnormality occurring CPU during the resynchronization processing for the redundant CPUs for example, it is possible to resume the operation of the normal CPU. Thus, it is possible to perform continuous operation that makes full use of CPU resources mounted on the system.

According to the present invention, when a synchronization break among CPUs occurs, it is possible to perform resynchronization processing for redundant CPUs without restarting an OS. The resynchronization processing for the redundant CPUs according to the present invention does not depend on functions of an OS running on a system. Therefore, it is possible to realize the resynchronization processing using a general-purpose OS.

According to the present invention, when a permanent fault occurs in any one of the redundant CPUs, it is possible to continue operation of normal CPUs. According to the present invention, for example, when an error occurs again in an abnormality occurring CPU during the resynchronization processing for the redundant CPUs, it is possible to resume the operation of the normal CPUs. Therefore, according to the present invention, it is possible to perform continuous operation making full use of CPU resources mounted on a system.

All examples and conditional language recited herein are intended for pedagogical purposes to aid the reader in understanding the invention and the concepts contributed by the inventor to furthering the art, and to be construed as being without limitation to such specifically recited examples and conditions, nor does the organization of such examples in the specification relate to a showing of the superiority and inferiority of the invention. Although the embodiment(s) of the present invention have been described in detail, it should be understood that the various changes, substitutions, and alterations could be made hereto without departing from the spirit and scope of the invention.

What is claimed is:

1. An information processing apparatus comprising a first system board including a first arithmetic processor and a second arithmetic processor that simultaneously execute same processing, a first control device connected to the first and the second arithmetic processors and also connected to a storing device, a second system board including a second control device, and a relay device that relays the first and the second system boards, the first system board comprising:

an instruction inputting unit that inputs an instruction which is issued from any one of the first and the second arithmetic processors to the second system board via the relay device;

a detecting unit that detects a break of a synchronization between the first arithmetic processor and the second arithmetic processor by detecting abnormality occurrence in any one of the first and the second arithmetic processors;

an instruction issue stopping unit that instructs the instruction inputting unit to stop the issuance of an instruction from the first or second arithmetic processor as an abnormal arithmetic processor in which the abnormality is detected;

an instruction inhibiting unit that inhibits an instruction input from the second control device to the first control device by continuing to input a retry packet to the second control device via the relay device;

a saving unit that saves internal information held by either of the first arithmetic processor or the second arithmetic processor as a normal arithmetic processor that is in a normal condition into the storing device when the abnormality is detected in one of the first or second arithmetic processors;

an initializing unit that initializes both of the first and the second arithmetic processors;

a restoring unit that restores the internal information of the normal arithmetic processor saved in the storing device to both of the initialized first and second arithmetic processors; and an instruction inhibition canceling unit that cancels the inhibition of the instruction issued from the second control device to the first control device and that resumes synchronous operation of the first and second arithmetic processors, when the internal information is restored to both the first and second arithmetic processors.

2. The information processing apparatus according to claim 1, wherein the first system board further comprises a determining unit that, when the issuance of the instruction from the abnormal arithmetic processor is stopped, determines whether a number of times a synchronous operation of the first and the second arithmetic processors is resumed is equal to or larger than a predetermined number of times, and causes the restoring unit to restore the internal information saved in the storing device only to the normal arithmetic processor if the number of times of the synchronous operation is larger than the predetermined number of times.

3. The information processing apparatus according to claim 1, wherein the first system board further comprises a restoration suspending unit that suspends the restoration of the internal information saved in the storing device to the abnormal arithmetic processor, resumes an operation of the normal arithmetic processor in which the internal information is restored, and cancels the inhibiting of the instruction issued from the second control device to the first control device, when the detecting unit has detected again an abnormality in the abnormal arithmetic processor while restoring the internal information saved in the storing device to the initialized first arithmetic processor and the initialized second arithmetic processor.

* * * * *

UNITED STATES PATENT AND TRADEMARK OFFICE
CERTIFICATE OF CORRECTION

PATENT NO. : 8,181,064 B2  
APPLICATION NO. : 12/659896  
DATED : May 15, 2012  
INVENTOR(S) : Takeshi Owaki et al.

Page 1 of 1

It is certified that error appears in the above-identified patent and that said Letters Patent is hereby corrected as shown below:

Title page Column 1, After item

"(65)     Prior Publication Data

US 2010/0191942 A1   Jul. 29, 2010"

insert

-- Related U.S. Application Data

(63) Continuation of application No. PCT/JP2007/068503, filed on Sept. 25, 2007. --.

Signed and Sealed this  
Eighteenth Day of September, 2012

David J. Kappos  
*Director of the United States Patent and Trademark Office*